United States Patent [19]
Courville

[11] Patent Number: 5,393,175
[45] Date of Patent: Feb. 28, 1995

[54] DIAMOND CORE DRILL

[76] Inventor: Léo Courville, 5639 De Castille, Montréal-Nord Québec, Canada, H1G 3E6

[21] Appl. No.: 77,921

[22] Filed: Jun. 18, 1993

[51] Int. Cl.⁶ .................. B23B 51/04; B23B 51/06
[52] U.S. Cl. .................................... 408/56; 175/170; 408/80; 408/101; 408/204; 408/207
[58] Field of Search .............. 175/53, 170, 195; 408/67, 79, 80, 101, 102, 137, 138, 204, 56, 61, 128, 207

[56] References Cited

U.S. PATENT DOCUMENTS

| | | |
|---|---|---|
| 306,477 | 10/1884 | Fuller . |
| 604,410 | 5/1898 | Moore .................. 408/101 |
| 2,287,354 | 6/1942 | Misch .................. 408/101 |
| 2,914,305 | 11/1959 | Wink .................... 175/170 |
| 3,186,261 | 6/1965 | Howard et al. ........ 408/111 |
| 3,293,952 | 12/1966 | Fairbanks ............. 408/56 |
| 3,461,750 | 8/1969 | Achelis et al. ....... 408/56 |
| 3,825,362 | 7/1974 | Hougen ................. 408/68 |
| 3,973,862 | 8/1976 | Segal .................. 408/703 |
| 4,620,823 | 11/1986 | Hillestad ............. 409/178 |
| 4,902,174 | 2/1990 | Thompson ............. 408/101 |
| 4,911,253 | 3/1990 | Cliche ................ 175/213 |

FOREIGN PATENT DOCUMENTS

| | | |
|---|---|---|
| 493209 | 5/1950 | Belgium . |
| 3724232 | 7/1987 | Germany ................ 408/204 |
| WO/8302738 | 8/1983 | WIPO ..................... 83/113 |
| WO/8801190 | 4/1988 | WIPO ..................... 82/113 |
| WO/8910815 | 5/1989 | WIPO ..................... 408/204 |

*Primary Examiner*—Daniel W. Howell
*Attorney, Agent, or Firm*—Pierre Lespérance; Francois Martineau

[57] ABSTRACT

A diamond core drill using a sealed core bit is fastened centrally by means of a hollow shaft with a slanted cut at one end, that is used in a wedging manner to secure the tool against the work surface. This eliminates the need for an exterior frame and thus permits the use of large hole saws up to 48", held by a simple and economical tool. The tool feed towards the surface is controled via an advance control nut that screws on the filleted part of the shaft. The tool has a water feed system that entraps the water in a chamber formed by the barrel of the saw and the surface to be cut, that forces the water to seep along the sawing gap thus facilitating lubrication of the core bit. The resulting configuration is such as to allow for a single tool operator.

14 Claims, 9 Drawing Sheets

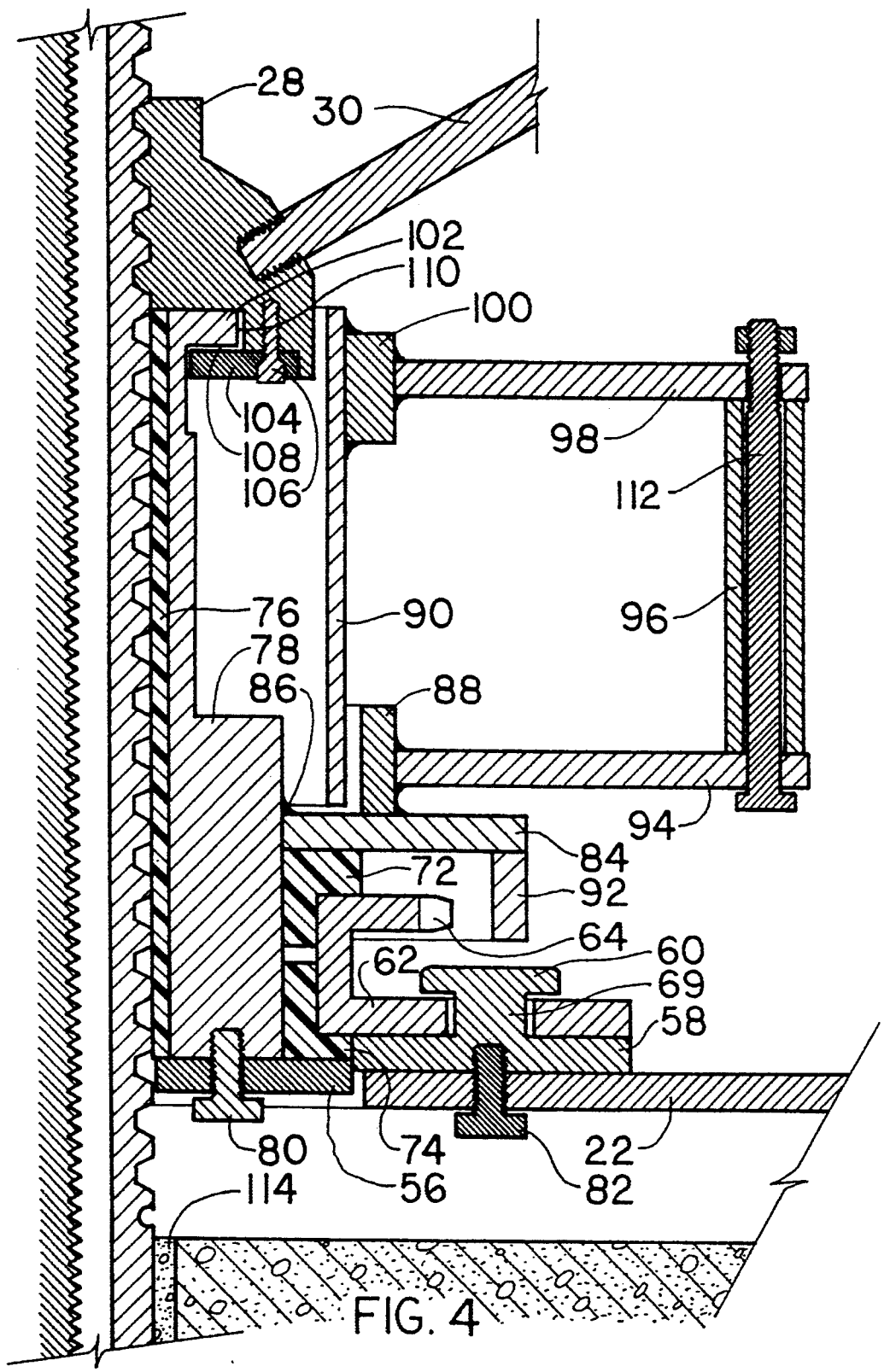

DIAMOND CORE DRILL

BACKGROUND OF THE INVENTION

1. Field of the Invention

This invention is related to the field of diamond drilling equipment, especially diamond core drilling in concrete with a tool which can operate at different angles. The diamond core drilling equipment of the invention is employed to drill holes in concrete surfaces.

2. Description of the Prior Art

A prior art patent search was conducted and a list of patents which appeared to us to be most pertinent to the invention follows.

WO 89/1081 Nov. 16, 1989 Depres shows a hole saw guided by a pilot drill. When the motion of the drill is reversed and the hole saw prevented to rotate, the hole saw pulls back, thus freeing the carrot. Though this system has the potential to be used to drill larger holes in concrete, it provides no means to bring cutting fluid to the surface, because all parts are rotating simultaneously.

U.S. Pat. No. 4,620,823 Nov. 4, 1986 Hillestad illustrates a portable milling tool using a collet at the end of a shaft as a wedging means to secure and centre the tool. Although the advance of the cutting tool is commanded by a nut moving along a threaded shaft, the system is quite complex due to internal gear mechanism and would prove costly and cumbersome for larger applications such as diamond core drilling in concrete. Also no means are provided to bring cutting fluid to the work surface.

U.S. Pat. No. 4,911,253 Mar. 27, 1990 Cliche describes a core water and mud collector tool for use by a carrotting drill. Though the system provides water to the cutting area, it needs external means to do so. At least a second operator with a hose is needed to spray water on the core bit. Also there is no means for precisely centering the hole on the concrete surface and controlling the rate of advance of the bit.

BE 493209 May 2, 1950 Victor Products illustrates a system in which the advance of the drill is controlled by threads engaging the bit's spiral wall. An implant, in which the bit screws itself, must be installed on the surface in which the hole is to pierced. The implant must first be inserted in a shallow hole where ears are pushed outwardly to restrain any retrieving movement while piercing. This system has three drawbacks: first the advance rate is dependent upon the rotation rate of the bit; secondly, the size of the hole is limited by the size of the implant, meaning that a different implant is needed for each hole size; finally, no means of feeding the cutting area with fluid is provided.

U.S. Pat. No. 4,902,174 Feb. 20, 1990 Thompson describes a system in which an external collar is used to secure and centre the piercing apparatus. A collar system of this type is impossible on flat surfaces.

WO 83/02728 Aug. 18, 1983 TRI-TOOL describes a portable machine tool for preparing pipe ends as illustrated on front page of patent document. This system uses expandable wedging mandrel means for radially gripping the interior of a pipe; the tool feed drive is once again composed of a nut that pushes the tool 70 towards the work. In this case the nut 82 is turned via a gear mechanism which is practical for small scale such as pipe end applications, but which would be cumbersome for twelve inch diameter and over diamond core drilling. Also the twin horizontal ball bearing support would be costly to reproduce in large diameter applications. In such cross shaped tool arrangement, the use of central water feeding would be impractical.

U.S. Pat. No. 3,825,362 Jul. 23, 1974 Hougen shows a cup shaped annular cutter for forming circular hole. The tool provides spring loaded means to center the carrotting bit, but none to support it. Still, there is no means of spraying cutting fluid.

DE 3724-232-A Feb. 2, 1989 Fein shows a diamond core drill mounted on a pillar fixed to a base. Typical drilling equipment for this application employs an external support system for the hole saw. However this kind of system comprises many cantilever supports which make the system unstable and limited in power. Moreover, when tilted to be used at a certain angle —FIG. 5—, the fixation of the barrel forms a second cantilever, limiting even more the use of the capacities of the drill. Finally, the barrel diameter is limited to 12 inches.

U.S. Pat. No. 306,477 Fuller, Oct. 14, 1884 provides central support for core bit via a bridge structure which could permit large diameter drilling but with large dimension arrangement. This method nowadays illustrated in FIG. 6 makes use of an external support bridge that supports the diamond bit. This arrangement permits the use of larger diamond bits but requires much larger working space, much larger than the drill bit diameter.

WO 88/02290 Apr. 7, 1988 TRI-TOOL illustrates a mandrel assembly for a portable lathe. A blocking system 62 is used at the end of a shaft assembly 50 to secure and center the tool onto the work piece 38. The tool feed mechanism is comprised of a threaded shaft 32 for milling feeding 34 by turning handle 44. A manually tightened nut 90 pulls end 80 towards the block piece 62. The system does not have any capability to provide cutting fluid to the cutting apparatus, other than by external means.

While study of the prior art shows several inventions using means which could prove useful in diamond core drilling, none has a combination of means or capabilities of the invention herein described.

SUMMARY OF THE INVENTION

One of the objectives of the invention is to address the drawbacks of the prior art and to drill concrete with a system using large bits of up to 48 inches in diameter, with a tool that is compact, simple and easy to adapt to existing core bits and to provide for more efficient drilling in concrete.

Another objective is to have a machine that should be able to drill at various depths by changing the bit or the bit support shaft. The third objective is to minimize the needed workspace to operate the machine, more precisely to a size inferior to the diameter of the drill bit and to provide a system that can be moved by one or two man.

The fourth objective is to provide a system able to drill at any angle that is not perpendicular to the surface to be pierced.

The fifth objective is to use a threaded shaft serving as a central axis for a hole to be drilled and wherein a hydraulic motor drives a rotor that is moved along the shaft by a screw mechanism, a circular centre hole serving also as a guide to drill from opposing sides if needed. A corollary objective is to furnish a hold in the centre of the drilled hole to remove the carrot left by the bit once the drilling is complete.

A sixth objective is to provide an independant water feeding system that can furnish enough pressure to wet the cutting area even if the tool is almost upside-down.

The above mentioned and other advantages of the invention will better be understood in reference to the following description and drawings in which:

FIG. 4 is an enlarged cross section according to line 4—4 of FIG. 2.

Figure 1:
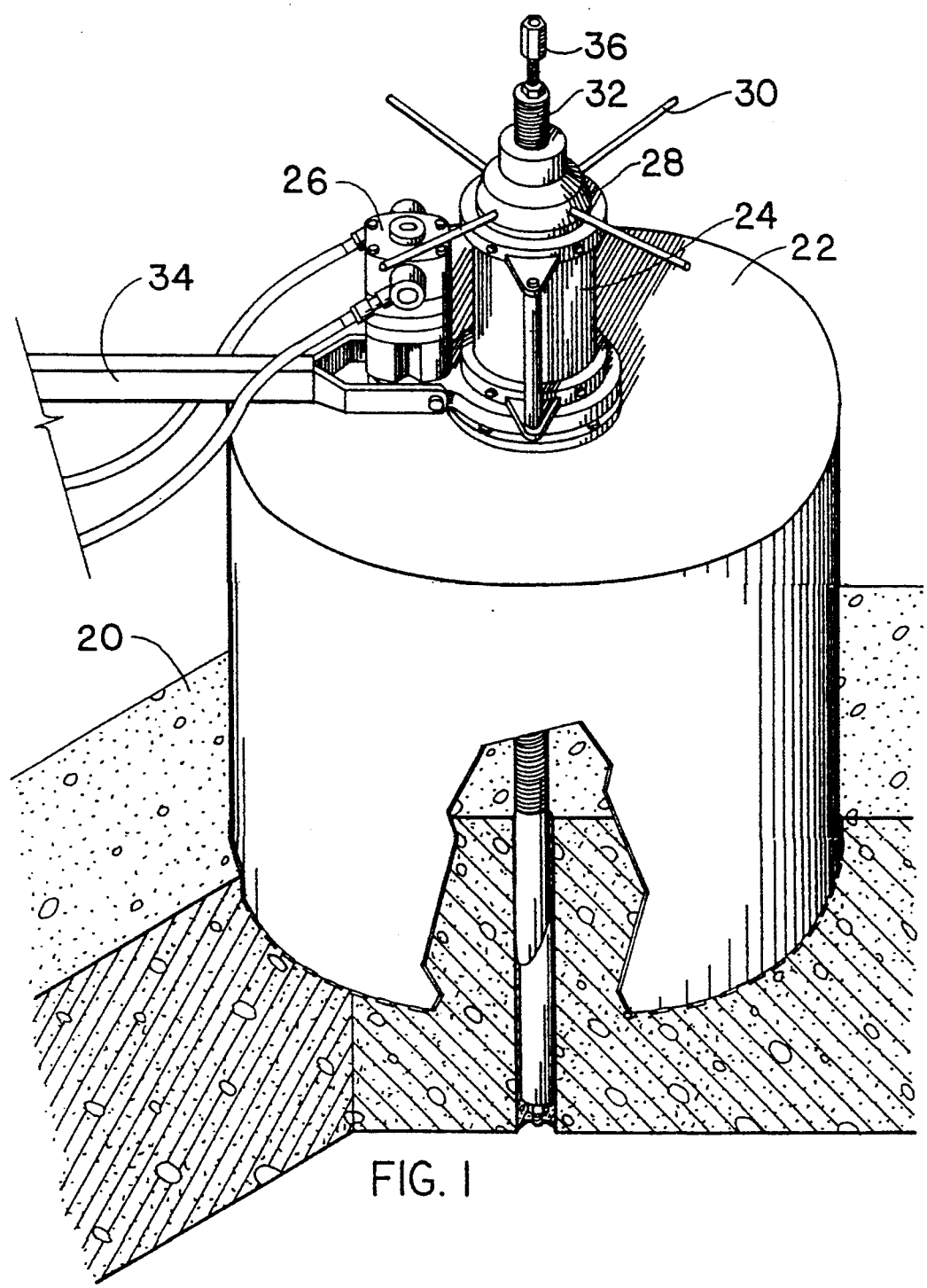
FIG. 1 is a perspective of the tool.

By referring to FIG. 1, the components of the tool can be identified by like numbers on all figures, where one can see: a concrete block 20 topped by a circular diamond barrel bit 22 on top of which is attached a support 24 which is attached to a hydraulic motor 26. The support itself is surmounted by a nut 28 equipped with handlebars 30. The nut 28 travels along a threaded shaft 32 going through the centre of the tool and secured by anchoring means in the concrete block 20. To the support 24 is also attached a retaining arm 34 that touches some surrounding structure. The threaded shaft 32 comprises a central tightening nut 36. The threaded shaft 32, further detailed in FIG. 2, which shows in section a head 38, a threaded body 40 and a smooth extension 42 at the end of which, in the end zone, is cut an angle 46. The threaded shaft 32 is hollow and is tranversed in its centre by an inner screw 48 at the lower end of which is a locking nut 50 and at the upper end of which there is a nut 52, a washer 54 and the screwing head 36. The hollow threaded shaft 32 is enclosed in body 24 and is surrounded at the bottom by a disk 56. The whole assembly, body 21, threaded shaft 32 and disc 56, goes through a male plate 58 mounted on the barrel 22 and fitted with bayonets 60. A bronze female plate 62 is adapted to receive the bayonets 60 and is fitted with teeth 64 to receive a driving chain 66 moved by the hydraulic motor 26. The bronze plate 62 possesses female openings 68 large enough to allow passage of the heads 60 of the bayonnets. The bayonnet has a narrow neck 60 which protrudes from the male part 58 and can engage into the narrow part 70 of the female slot when the female plate 62 moved from a rest position to a work operating position. As the female narrow slot 70 engages the bayonnet from the male plate 58, the female puts the male plate already attached 82 to the core bit 22 into motion ready for the cutting process. The female plate while in rotation bears against L-shaped bushing 72 and 74, each adjustable vertically and forming a seat attached to the support body 24.

The support body 24..FIG. 4..comprises a linear bushing 76 surrounded by a main screw housing 78 which is centrally set on the retaining plate 56 by screw means 80; a support plate 84 welded 86 on the housing 78 serves as a base for the following items, the hydraulic motor 26, the blocking arm 34, a first lower handle retaining cylinder 88, a cover sleeve 90 and a chain guard 92. Against the housing 78 rest the L-shaped low friction nylon bushings 72 and 74, the lower bushing 74 being also entrapped between retaining plate 56 and female plate 62. The upper L-shaped bushing 72 is itself entrapped between the main support cylinder 78, the female plate 62 and the support plate 84. The upper low friction L-shaped bushing 72 in entrapped between the female plate 72, the main cylinder housing 78 and the support plate 84. The handle assembly comprises in addition to the retaining cylinder 88 a lower handle arm 94, a handle 96, an upper handle arm 98, a second upper handle retaining cylinder 100. The retaining cylinder 100 is welded to the outer sleeve 90. The central liner bushing 76 is inserted between the main threaded shaft 32 and the main cylinder housing 78 allows for smooth translation of the main housing along the threaded shaft 32. The friction is low because the only sliding surface is the crest of the threads.

The advance controling nut 28 screws into the threads of the main filleted shaft 32 and extends downwardly into the gap between the main housing cylinder 78 and the outer sleeve 90. The main housing cylinder 78 possesses in its upper part an outwardly directed edge 102 which permits vertical attachment to the advance control nut 28. The locking is made possible by means of a split brass thrust washer 104 which extends underneath the upper edge 102 of the main housing cylinder 78. The washer is maintained fixed to the advance control nut by means of bolts 106. The split in the thrust washer 104 allows its assembly around the main housing cylinder under the edge 102. A gap 108 is left between the brass washer 104 and the edge 102 and between the edge 102 and the inside wall 110 of the advance control nut 28. Four handle arms 30 are screwed at an angle of near 30 degrees onto the advance control nut.

Figure 2:
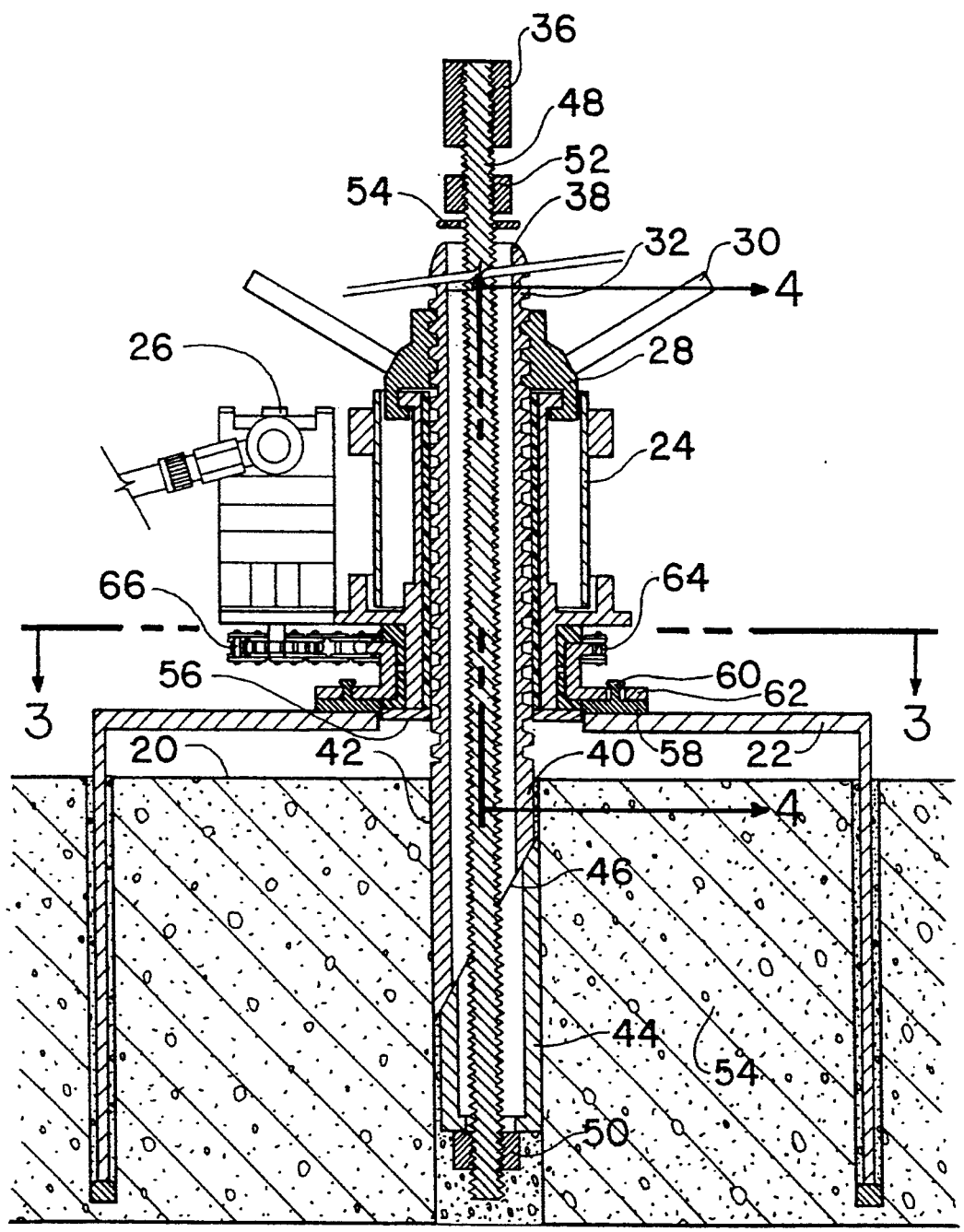
FIG. 2 is a longitudinal cut of the tool.
Figure 3:
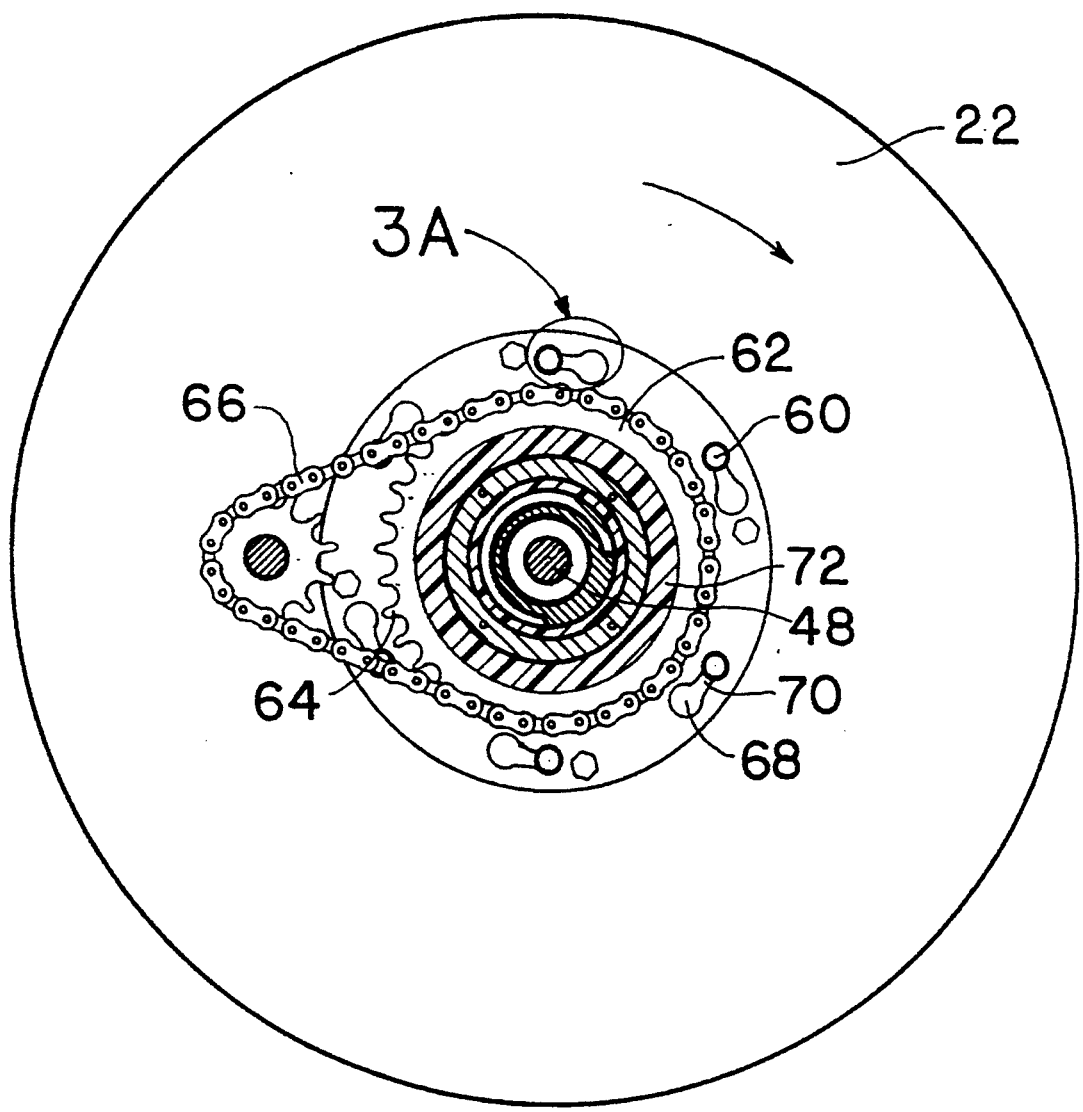
FIG. 3 is a side cut of the tool showing the bit drive mechanism.
Figure 3A:
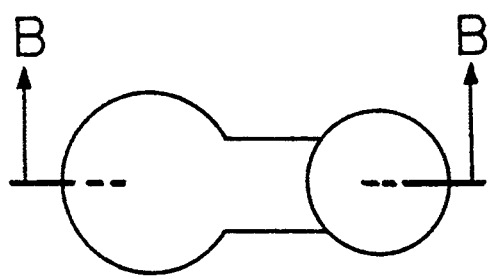
FIG. 3A is en enlarged view of FIG. 3 showing a bayonet in operating (locked) position.
Figure 3D:
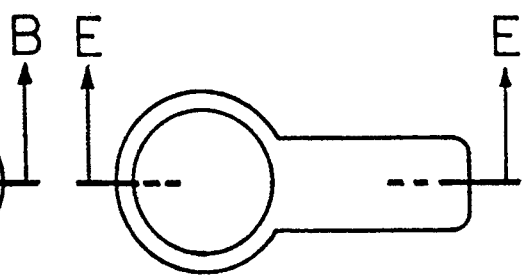
FIG. 3D is an enlarged view showing a bayonet in unlocked position.
Figure 3B:
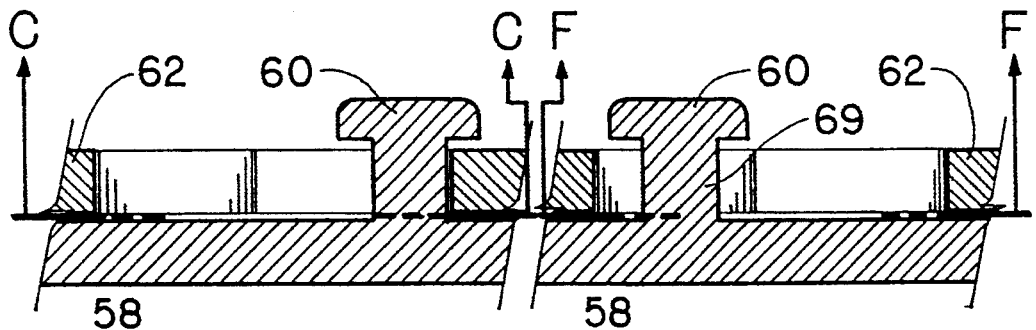
FIG. 3B is a cross section according to line B—B of FIG. 3A.
Figure 3E:
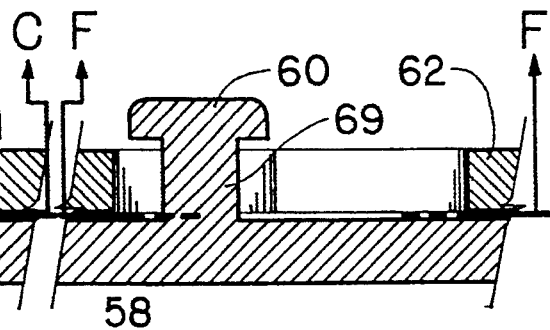
FIG. 3E is a cross section, according to line E—E of FIG. 3D.
Figure 3C:
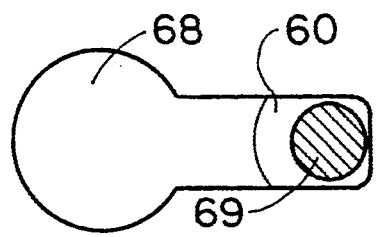
FIG. 3C is a cross section according to line C—C of FIG. 3B.
Figure 3F:
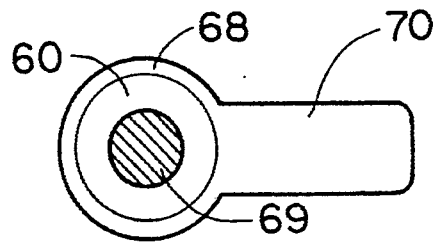
FIG. 3F is a cross section, according to line F—F of FIG. 3E.

The tool is put together by inserting the central screw 48..FIG. 2..into the threaded shaft 32. The inferior 50 and superior 52 nuts are added to the inner screw 48. The parts are assembled onto the hollow threaded shaft 32 in the following order: the plate 58 were will eventually be mounted the bit 22, the support plate 56, the first lower L-shaped bushing 74, the slotted plate 62, the chain 52 onto the teeth 37 of the slotted plate 62, the chain being to be eventually driven by a hydraulic motor 26, the second upper "L" shaped bushing 72, the liner bushing 76 that will then be covered by the main housing cylinder 78, the split brass thrust washer 104. The nut 28 is then screwed onto the threaded shaft 32. The nut 28 is the only part that actually screws onto threaded shaft 32. The cover 90 is added and the handle bars 30 are screwed to the sides of the nut 27, and the handle is bolted 112. Finally the other parts, hydraulic motor 46, support arm 50, and bit 42 are assembled.

Figure 5:
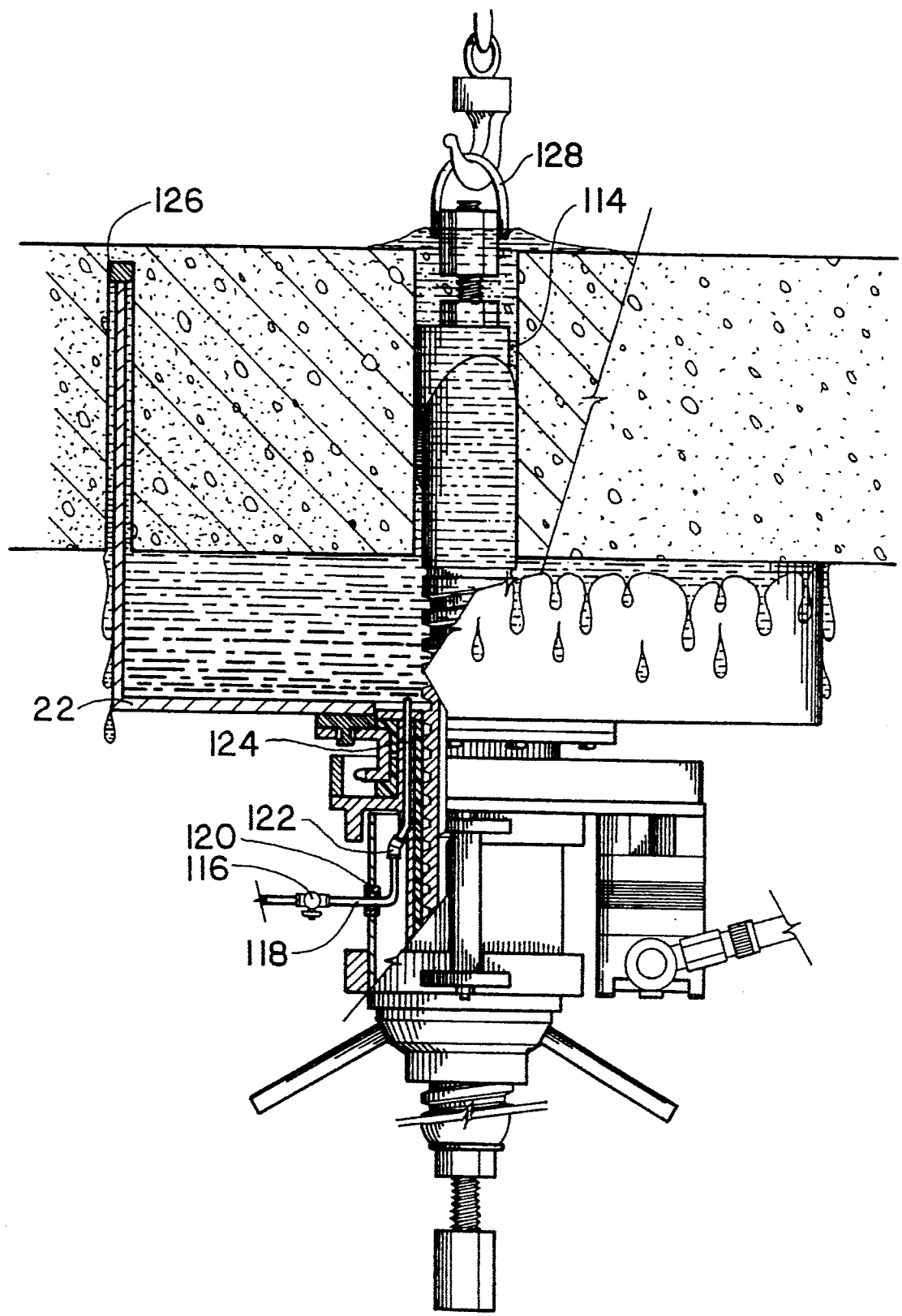
FIG. 5 is a cross section showing the water feeding system.
Figure 6:
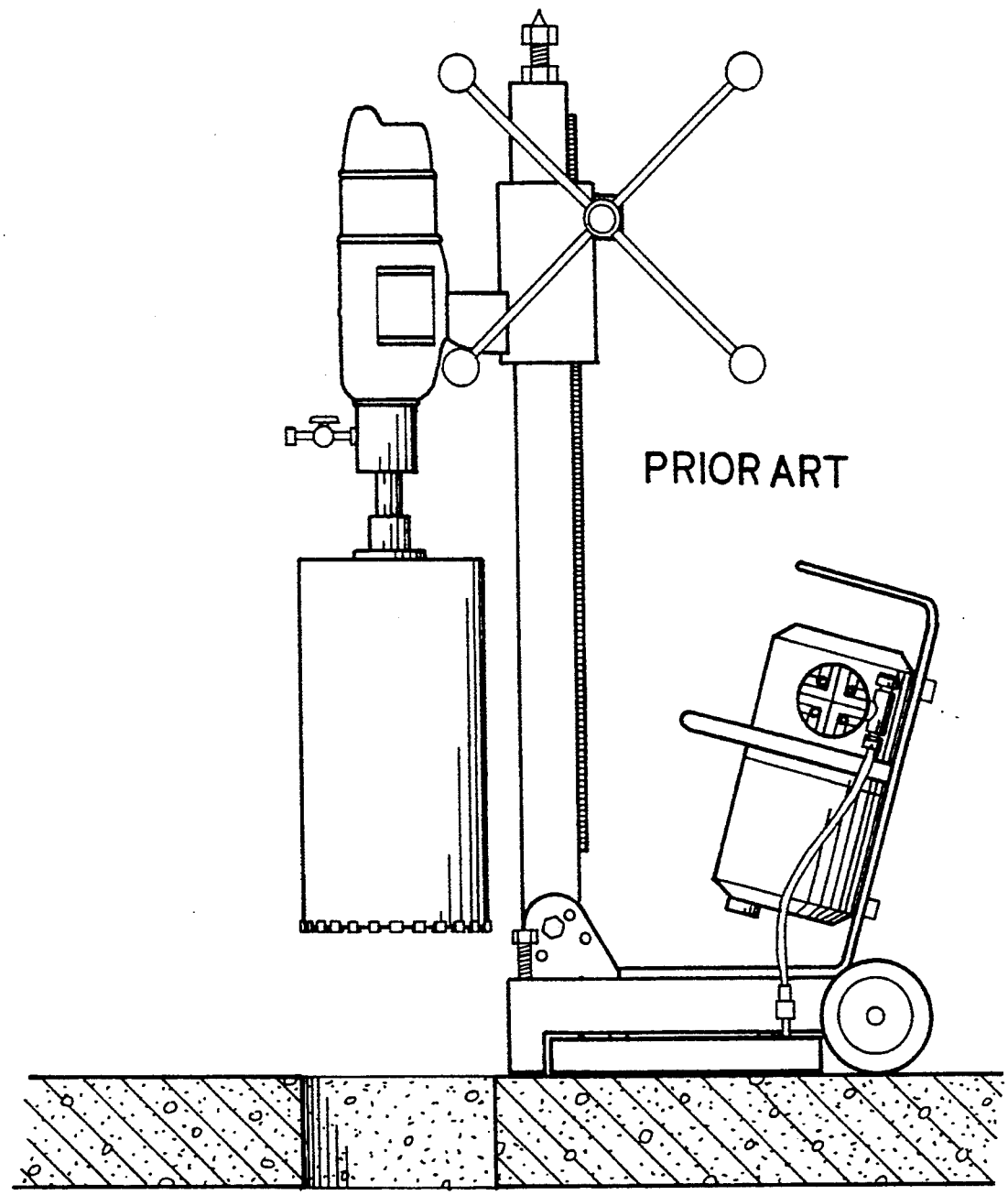
FIGS. 6, 7 and 8 are drawings of the prior art, FIG. 6 illustrating downward piercing, FIG. 7 angle piercing and FIG. 8 a large bit.
Figure 7:
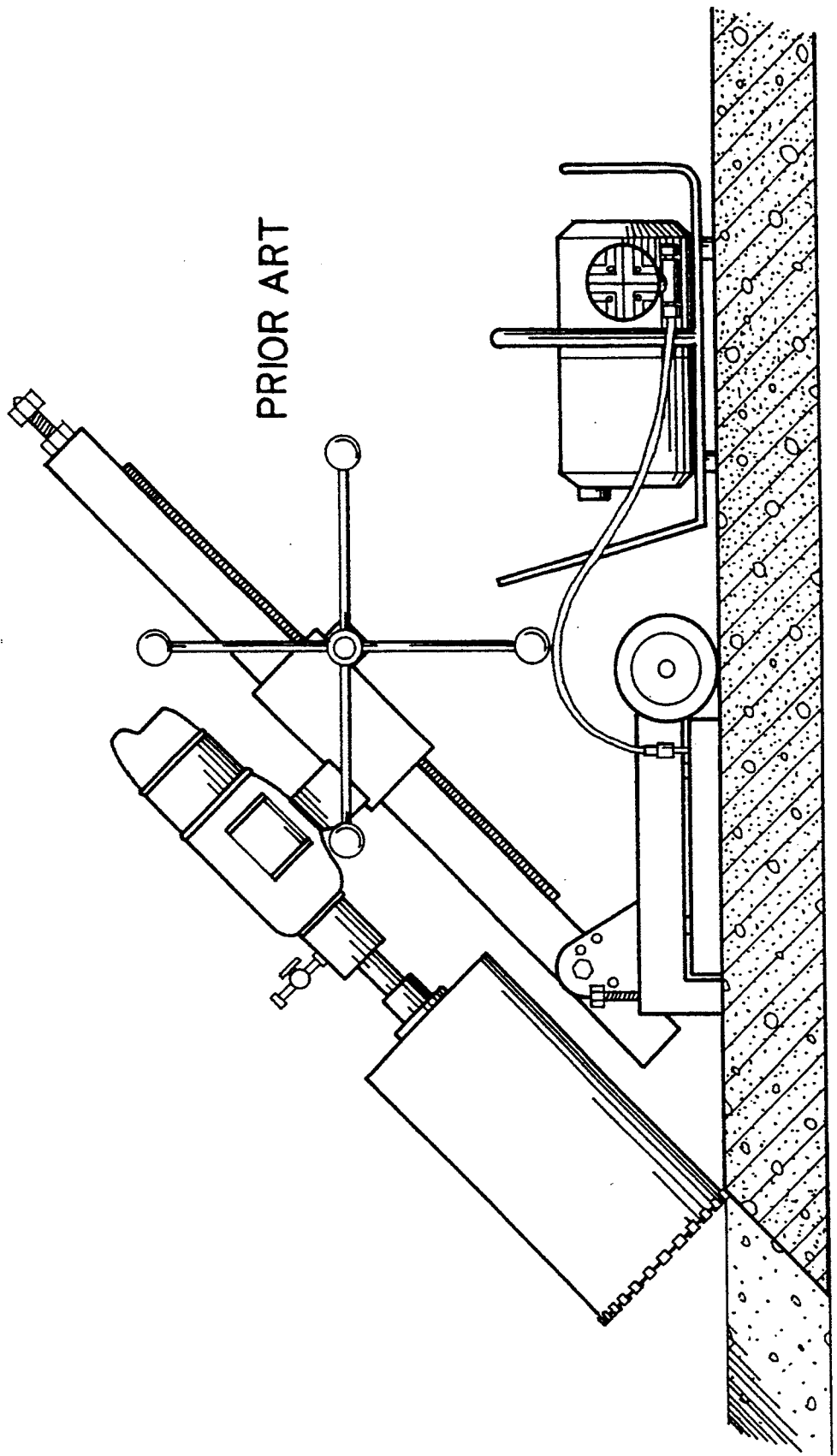
Figure 8:
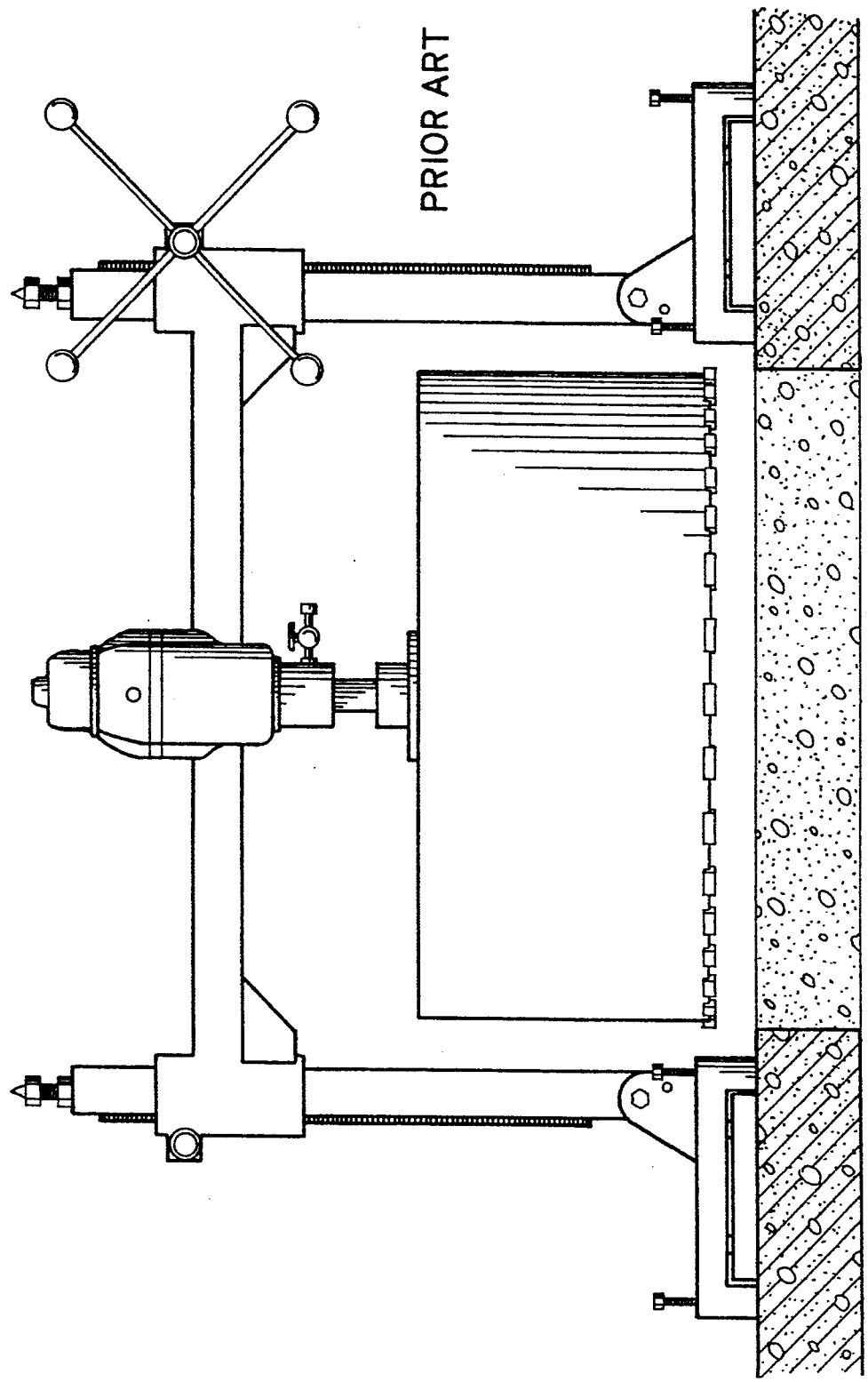

The water system..FIG. 5..of the preferred embodiment includes a coupling valve 116, an opening 120 in side wall 24, an adapter 122, a tube 128 passing through an opening 124 in the housing 78 such as in area of screw 80 FIG. 4. Water is required at all times to protect the diamonds during drilling. The water passes through the housing, a non rotating stator and builds up in a chamber formed by the barrel of the core bit and the working surface of the carrot. As the teeth bite more deeply into the material, the pressure builds up as the size of the chamber is reduced by the advance of the bit. The entrapped water is thus pushed through the gap 126 between the spinning barrel and the carrot, thus lubricating the entire cutting surface inside and outside the barrel. The injection is carried out at the cylinder level 120 and the resulting pressure causes the water to flood the edge of the barrel of the saw. In overhead sawing the carrot is supported 128. To use the tool, these steps must be followed:

1. An operator drills a hole 114 of $2\frac{7}{8}''$ in diameter in the concrete at full depth using a conventional method.
2. The operator inserts the threaded shaft 32 onto which are mounted the advance control nut 28 and support 24..FIG. 2..into the hole 114.
3. The operator tightens the superior screw 36 to force the lower nut 50 against the bottom wedge 44 along the slant 46 thus blocking the central shaft wthin the guide hole 114.
4. He then tightens the central screw 52 to lock the wedge parts 46 thus preventing slacking of the wedge 46 in the hole 114.
5. He then insures are protruding from the female opennings 68 for engagement in locked position and that the arm 34 is resting nearby structure to body 24 from rotating.
6. The operator then lowers the bit 22 by means the advance control nut 28 towards the surface 20 of the concrete without actually touching it.
7. He then starts the hydraulic motor 26, driving the rotating part 64 with the chain 66. This puts into motion the male plate 58 attached to the bit 42.
8. When the core bit 22 has reached its full rotation speed, the operator brings it onto the surface 20 of the block using the advance control nut; he opens the water feed and can then begin to drill and, if cutting upwards he waits until the barrel is filled with water before drilling.
9. He feeds the core bit 22 by means the advance nut 28 as much as needed for the bit to burrow into the concrete.
10. When the drilling is complete, the operator removes the bit 22 by unwinding the advance control nut 28. The carrot 54 remains stuck in its centre by the wedging action of the slanted cut part 46 of the threaded shaft 32 and can be retrieved via appropriate hoisting or support means.

Other embodiments are also possible and limited only by the scope of the appended claims.

I claim:

1. A tool for carrotting a concrete surface comprising:
    carrotting means, comprising a hollow cylinder with an open and a closed end, said closed end being sealed and adapted to provide means for supporting said carrotting means, and said open end comprising diamond cutting means,
    motor means connected to said carrotting means for rotational driving of said closed end,
    shaft means for aligning centrally said carrotting means, comprising means for displacing said carrotting means along the axis of said shaft means, independently of the rotational speed of said carrotting means,
    housing means for containing said motor means and said shaft means,
    means for securing said shaft means in the area to be carrotted,
    water feeding means comprising a water connection within said housing, water channeling means from said housing to the interior of said sealed hollow cylinder thereby allowing water passage from exterior to the interior of said carrotting means and to the diamond teeth of said open end.

2. A tool as defined in claim 1 wherein said motor means comprise a hydraulic motor connected through a chain mechanism to said carotting means.

3. A tool as defined in claim 2 wherein said chain mechanism comprises a geared plate coupling attached to said carrotting means.

4. A tool as defined in claim 3 wherein said geared plate is removably coupled and comprises a male plate attached to said carrotting means and a geared female plate driven by said chain mechanism, said female plate comprising a reducing width opening allowing bayonets from said male plate to slide into a locked position.

5. A tool as defined as is claim 1, wherein said area to be carrotted includes a hole pierced centrally in advance, and wherein said shaft means comprise:
    a threaded shaft comprising a bottom and a center portion, said bottom comprising means for securing to said hole, said center portion comprising bearing means for allowing carrotting means to rotate freely around said center portion.

6. A tool as defined in claim 5 wherein said bearing means comprise two bushings with L-shaped cross-section and disposed on the top and bottom of said driving means.

7. A tool as defined in claim 5 wherein said displacing means comprise means for rotatively mounting an advance control nut engaging threads of said threaded shaft.

8. A tool as defined in claim 7 wherein said means for rotatively mounting comprise a split brass thrust washer mounted around said shaft means and adapted with means for entrapping said housing means.

9. A tool as defined in claim 8 wherein said housing means comprise a top flange and a central axial portion circling said shaft means.

10. A tool as defined in claim 9 wherein said means for entrapping comprise placing said split brass thrust washer under said top flange.

11. A tool as defined in claim 7 wherein said advance nut comprises handle bars for manual displacement of said housing along said shaft.

12. A tool as defined in claim 5 wherein lever means are connected to said housing for restraining the rotation of said housing and safety means for safe handling.

13. A tool as defined in claim 5 wherein said securing means comprise a wedged portion in the bottom part of said threaded shaft, said threaded shaft comprising in its interior a screw connected to said wedged portion and to the top of said shaft, the action of tightening said screw from the top causing the wedging of said wedge portion against the walls of said hole.

14. A tool as defined in claim 1 wherein said water channelling means comprise a hole pierced through the center of said housing means.

* * * * *